United States Patent Office 3,849,379
Patented Nov. 19, 1974

3,849,379
PROCESS FOR THE SEMI-CONTINUOUS PREPARATION OF HIGH-MOLECULAR WEIGHT LINEAR POLYESTERS
Lambert Gaston Jeurissen and Frans Antoon De Smedt, Edegem, Belgium, assignors to Agfa-Gevaert N.V., Mortsel, Belgium
No Drawing. Filed May 8, 1972, Ser. No. 251,167
Claims priority, application Great Britain, May 21, 1971, 16,347/71
Int. Cl. C08g 17/01
U.S. Cl. 260—75 M                                8 Claims

ABSTRACT OF THE DISCLOSURE

The manufacture of high molecular weight polyesters from terephthalic acid and ethylene glycol is described. In a first reaction step terephthalic acid and ethylene glycol are added to bis(2-hydroxyethyl)terephthalate. Up to 1.1 mole, preferably 1 mole, of terephthalic acid is added per mole of bis(2-hydroxyethyl)terephthalate and 0.3 to 0.9 mole of ethylene glycol per mole of terephthalic acid. The mixture is heated at 240–310° C. in an inert atmosphere and at atmospheric pressure until a precondensate is formed. Half the amount of this precondensate is polycondensed further in a second reaction step at 260–300° C. and at reduced pressure until a high molecular weight linear polyester is obtained. In a third reaction step the other half of precondensate is heated above 200° C. together with ethylene glycol. The amount of ethylene glycol added in this reaction step is such that when taken together with half the amount of ethylene glycol that has been added in the first reaction step, an amount of ethylene glycol is obtained that is molecularly equivalent to the amount of terephthalic acid added in the first reaction step. In this third reaction step the precondensate is glycolised to bis(2-hydroxyethyl)terephthalate that is recycled to the first reaction step.

The invention relates to a process for the preparation of high-molecular weight polyesters by direct esterification of dicarboxylic acids with glycols, followed by polycondensation of the esterification product formed. The process can be performed continuously, discontinuously, or semi-continuously.

The classical industrial processes for the preparation of high-molecular weight linear polyesters start from dialkyl esters of dicarboxylic acids and not from the dicarboxylic acids themselves. For instance, in the preparation of polyethylene terephthalate, dimethyl terephthalate is used instead of the more obvious terephthalic acid. An important reason hereto is that it has been almost impossible so far to produce terephthalic acid having a sufficient degree of purity. Moreover, the synthesis of polyethylene terephthalate starting from dimethyl terephthalate is much easier to be performed. In this process 79.9% by weight of the terephthalic acid is built in the polyester molecule, whereas for dimethyl terephthalate this amount is only 68% by weight. This means a gain of more than 15% by weight of raw material consumed, which mostly results in a more favourable cost-price.

In the meantime terephthalic acid having a sufficient degree of purity became commercially available. This resulted in an increased interest for processes wherein high molecular weight polyesters are produced, starting from terephthalic acid and ethylene glycol.

The solubility of terephthalic acid in ethylene glycol is rather poor even at the boiling temperature (197° C.). As a result thereof the esterification rate of terephthalic acid with ethylene glycol is very low. This constitutes the principal difficulty in processes wherein terephthalic acid itself is used as one of the starting materials. It has been proposed to increase the solubility of terephthalic acid in ethylene glycol by working at higher temperatures. Naturally, this necessitates the esterification under pressure in special pressure vessels. These increased temperatures, however, favour the formation of ether bonds in the polyester molecules, resulting in a considerable lowering of the mechanical properties of the polyester.

An object of the invention is a process for the manufacture of high molecular weight polyesters starting from ethylene glycol and terephthalic acid. Another object is a process wherein the difficulties encountered when directly esterifying terephthalic acid with ethylene glycol do not occur. A further object is the manufacture of very interesting polyesters with a minimum amount of ethylene glycol.

According to the invention a process is provided for the production of high molecular weight polyesters from terephthalic acid and ethylene glycol, which process comprises adding in a first reaction step terephthalic acid and ethylene glycol to bis(2-hydroxyethyl)terephthalate, there being added up to 1.1 mole of terephthalic acid per mole of bis(2-hydroxyethyl)terephthalate, preferably 1 mole of terephthalic acid per mole of bis(2-hydroxyethyl)terephthalate, and 0.3 to 0.9 mole of ethylene glycol per mole of free terephthalic acid that is being added, heating at a temperature between 240 and 310° C. in an inert atmosphere and at atmospheric pressure until a precondensate consisting of a low molecular weight esterification product is obtained. About half the amount of precondensate formed is separated out and polycondensed further in a second reaction step at a temperature of 260 to 300° C. and at a reduced pressure until a high molecular weight linear polyester is obtained. In a third reaction step the other half of the precondensate is made to react at a temperature above 200° C. with ethylene glycol, the amount of ethylene glycol added in the third reaction step being such that when taken together with half the amount of ethylene glycol that has been added in the first reaction step, an amount of ethylene glycol is obtained that is molecularly equivalent to the amount of free terephthalic acid added in the first reaction step, thereby glycolising the precondensate to bis(2-hydroxyethyl) terephthalate that is recycled to the first reaction step.

At the start of the process of the invention a certain amount of bis(2-hydroxyethyl)terephthalate is needed. This bis(2-hydroxyethyl)terephthalate can be obtained by known processes, e.g. by a transesterification reaction between dimethyl terephthalate and ethylene glycol. This reaction is accelerated catalytically by the addition of known transesterification catalysts such as described in United Kingdom Patent Specification 816,215 filed June 24, 1955 by Gevaert Photo-Producten N.V. and in United Kingdom Patent Application 51,236/70 filed Oct. 28, 1970 by Agfa-Gevaert N.V.

If in practice dimethyl terephthalate is made to react with ethylene glycol there is not obtained a homogeneous product consisting solely of bis(2-hydroxyethyl) terephthalate. The product obtained is a mixture consisting mainly of bis(2-hydroxyethyl)terephthalate and a minor amount of low molecular weight esterification products thereof together with some free ethylene glycol. For simplicity's sake, however, the reaction product is referred to as bis(2-hydroxyethyl)terephthalate throughout the present specification and claims.

This bis(2-hydroxyethyl)terephthalate, as usual in known processes, could be further polycondensed with itself to form high molecular weight linear polyesters. To make possible, however, the use of terephthalic acid instead of having to start again and again with dimethyl terephthalate needed in the production of bis(2-hydroxyethyl)terephthalate, there are added to the starting amount of bis(2-hydroxyethyl)terephthalate in the first step of the process of the invention, well defined amounts of terephthalic acid and ethylene glycol. This addition occurs with continuous stirring at atmospheric pressure in an inert atmosphere and by heating of the reaction mixture at a temperature between 240 and 300° C. Up to 1.1 mole of terephthalic acid is added per mole of bis(2-hydroxyethyl)terephthalate. Preferably, however, equimolecular amounts of terephthalic acid and of bis(2-hydroxyethyl)terephthalate are mixed and 0.3 to 0.9 mole of ethylene glycol per mole of free terephthalic acid is also added thereto. The thus formed mixture is heated until a precondensate consisting of low molecular weight esterification product is obtained. As will be explained more explicitly further on half the amount of precondensate formed is polycondensed to high molecular weight, linear polyester and the other half is glycolised with ethylene glycol to reform bis(2-hydroxyethyl)terephthalate that can be used again in the first step of a following polycondensation batch.

In comparison to what is known from other processes wherein always an excess of ethylene glycol is present, in the first step of the process according to the invention only a relatively small amount of ethylene glycol is needed, i.e. between 0.3 and 0.9 mole per mole of free terephthalic acid. The reaction of terephthalic acid with the relatively small amount of ethylene glycol proceeds very fast so that after a short reaction time, i.e., depending on the temperature of the reaction medium, a clear reaction mixture is formed.

When more than 0.9 mole of ethylene glycol per mole of terephthalic acid is used, and especially when an excess of ethylene glycol is present, the process becomes less economical, since in these cases a larger amount of ethylene glycol is to be evacuated from the reaction medium. Adding amounts of ethylene glycol below 0.3 mole per mole of terephthalic acid would need much longer reaction times before a useful precondensate can be formed.

Although terephthalic acid and ethylene glycol may be added simultaneously to bis(2-hydroxyethyl)terephthalate, it is preferable to mix previously equimolecular amounts of terephthalic acid and bis(2-hydroxyethyl)terephthalate with stirring in an inert atmosphere at atmospheric pressure and heating until a temperature above 240° C., preferably of about 255° C. is reached. Only then the 0.3 to 0.9 mole of ethylene glycol per mole of terephthalic acid is added while stirring is continued and the temperature of the reaction mixture is increased to about 270° C. In this way the total reaction time to form the precondensate is shortened considerably.

It has been found that the reaction rate is greatly accelerated by the addition of some catalysts. When terephthalic acid is added separately and before the ethylene glycol is added, these catalysts may already be present in the reaction mixture together with the terephthalic acid. Further, it was found surprisingly that some catalysts, which are known to accelerate the polycondensation step in known processes, can be added advantageously during the first reaction step according to the invention. Very interesting results are obtained with antimonium-(III) oxide, antimonium(III) acetate or other soluble antimonium compounds, further with titanium compounds such as described in the United Kingdom Patent Specifications 1,072,812, 1,073,501, 1,079,376 and 1,079,377 all filed Mar. 11, 1965 by Gevaert-Agfa N.V. Even better results are obtained with compounds containing germanium, e.g. tetra-hydrocarbon derivatives of germanium such as described in United Kingdom Patent Specification 1,108,096 filed Mar. 17, 1966 by Gevaert-Agfa N.V. Other germanium compounds include those obtained by subjecting crystalline, hexagonal germanium dioxide to a digestion in an aqueous solution of an alkali metal hydroxide, ammonium hydroxide, or an alkaline earth metal hydroxide, e.g. sodium trihydrogen germanate as described in Belgian Patent Specification 741,156 filed Nov. 3, 1969 by Gevaert-Agfa N.V. Germanium dioxide itself may be used as a catalyst, though its solubility in the reaction mixture has to be enhanced then as described in the United Kingdom Patent Specifications 1,091,234 filed May 20, 1966, 1,185,984 filed Oct. 21, 1966 both by Gevaert-Agfa N.V. and 1,221,788 filed June 2, 1967 by Agfa-Gevaert N.V.

In this first reaction step a precondensate is formed consisting of a low molecular weight esterification product having an average polycondensation degree comprised between 2 and 10, more especially between 4 and 8.

The process of the invention is continued in a second reaction step by separating out about half the amount of precondensate formed in the first reaction step and further polycondensing at a temperature above 200° C. at a pressure preferably below 1 mm. of mercury until a high molecular weight linear polyester is formed. This further polycondensation can be carried out as a solid phase polycondensation, wherein granulated precondensate is heated in fluidized form in an inert gas atmosphere at a temperature above 200° C. and at a reduced pressure. This can be executed very conveniently in a vacuum tumbling drier, i.e. an apparatus that is normally used for drying polyester granulate before its extrusion. For this purpose the precondensate granulate while being agitated in the tumbling drier is heated at 200–240° C. under a pressure of 0.1 to 5 mm. of mercury.

The polycondensation reaction may also be carried out in the melt, the precondensate being stirred at a temperature of 270–290° C. and at a much reduced pressure, preferably comprised between 0.1 and 3 mm. of mercury.

In this second reaction step known polycondensation catalysts can be added to the reaction. When, however, germanium or titanium compounds were added already as catalysts during the first reaction step, no further addition of catalysts is required in the second reaction step. In this case the germanium or titanium compounds present already also catalyze the polycondensation reaction.

It might be advisable to add in the polycondensation reaction known stabilizing agents such as phosphoric acid, phosphorous acid and derivatives thereof such as triphenyl phosphate, triphenyl phosphite, tricresyl phosphite and also aliphatic phosphoric acid esters such as trimethyl phosphate; further also phosphonic acid esters. These known stabilizing agents may already be present during the esterification reaction in the first reaction step, thus contributing to a less pronounced colouration of the reaction mixture.

In a third reaction step the precondensate remaining from the first reaction step is glycolised with ethylene glycol to reform bis(2-hydroxyethyl)terephthalate. The amount of ethylene glycol that is added in this reaction step depends on the amount that was already present in the first reaction step. In this third reaction step there is added such an amount of ethylene glycol, that, when added to half the amount that has already been added in the first reaction step, an amount is obtained that is molecularly equivalent to the amount of free terephthalic acid added in the first reaction step. Since in the first step 0.3 to 0.9 mole of ethylene glycol per mole of terephthalic acid has been added, there is to be added in the third step from $$1-\frac{0.3}{2}=0.85 \text{ to } 1-\frac{0.9}{2}=0.55 \text{ mole}$$

of ethylene glycol.

The glycolisation mixture is stirred at a temperature above 200° C. for up to 30 minutes. During the reaction the precondensate is broken up and bis(2-hydroxyethyl)terephthalate is reformed, which is recycled to the first reaction step and, together, preferably with an equimolecular amount of terephthalic acid and the amount indicated for ethylene glycol, constitutes the necessary starting mixture for another esterification batch.

The addition of ethylene glycol to the precondensate melt not only results in a breaking up of the precondensate molecules, but at the same time the melting point is lowered considerably. This is of great importance when in the first step of a following esterification batch terephthalic acid is added to the glycolised precondensate. When the melting point would not be lowered, an immediate solidification would occur when the terephthalic acid is added, and thus would render impossible the homogeneous mixing of both materials.

Apart from the starting amount of bis(2-hydroxyethyl)terephthalate the semi-continuous process only consumes terephthalic acid and ethylene glycol, since in a following esterification batch there is used as starting material the bis(2-hydroxyethyl)terephthalate that is obtained by the glycolisation of half the amount of precondensate formed in the previous esterification batch.

The following examples illustrate the invention without limiting it thereto. In these examples the crystalline melting point of the polyester is determined by heating a crystallised sample of polyester on the heating stage of a polarising microscope. The temperature of the heating stage is raised at a rate of 0.8° C./min. The crystalline melting point is the temperature, at which between crossed nicols the last trace of birefringence disappears.

Differences in the melting point of consecutively prepared polyesters are mainly due to fluctuations in their diethylene glycol content. The higher this diethylene glycol content, the lower is the melting point of the polyester in consequence of the internal plasticisation of the polyester by the diethylene glycol present. According when a particular polyester has a high melting point, its diethylene glycol content is certainly very low.

At the end of the polycondensation step the colour of the molten polyester is compared visually with arbitrary colour standards consisting of aqueous solutions of Du Pont Pontamine Catechu 3G dye (colour index 36,300), according to the following system of colour ratings:

0=pure water
1=0.00025 gram of the above dye dissolved in 100 ml. of water
2=twice as much dye as in 1
3=three times as much dye as in 1
4=four times as much dye as in 1
5=etc.

The polycondensation degree of the polyester is given in the examples by its inherent viscosity, which is determined for 0.5% solutions of the polyester in 60:40 by volume mixtures of phenol and o-dichlorobenzene.

Unless indicated otherwise all parts given in the following examples are parts by weight and all percentages are percentages by weight.

For easiness' sake the name bis(2-hydroxyethyl)terephthalate will be abbreviated in the following examples to BHET, terephthalic acid to TA, and ethylene glycol to EG respectively.

In the first part of Example 1 a method is described for the manufacture of the starting amount of BHET needed in the process of the invention. This starting amount of BHET is then esterified with TA and EG to a precondensate and the full amount of precondensate is further polycondensed to a high molecular weight linear polyester. In the other examples the starting amount of BHET is made to react with TA and EG to form a precondensate. Half the amount of precondensate is polycondensed mostly as indicated in Example 1, the other half being glycolised to BHET and lower polymers thereof, which can be used in a semi-continuous manner as starting material for a following esterification batch.

EXAMPLE 1

19.4 g. of dimethyl terephthalate (0.1 mole) and 13.64 g. of EG (0.22 mole) were placed in a glass polymerisation tube and 6.5 mg. of manganese(II) phenyl acetate ($2.10^{-4}$ mole/mole of dimethyl terephthalate) were added. The reactants were heated for 3 hours at 197° C. at atmospheric pressure. A continuous stream of dry nitrogen was introduced through a capillary tube reaching to the bottom of the reaction tube. As soon as the ester interchange reaction was finished, the temperature was gradually raised over 30 min. to 250° C. and the excess of EG was distilled off. The BHET obtained was then used as the starting material in the first reaction step.

In a glass polymerisation tube equipped with a stirrer, an inlet for dry nitrogen, and a distillation column, a mixture was introduced of 25.4 parts of the above prepared BHET (0.1 mole), 16.6 parts of TA (0.1 mole) and 1.86 parts of EG (0.03 mole).

The reactants were heated and stirred at atmospheric pressure under a continuous stream of dry nitrogen and water was distilled off. As heating medium a vapour bath of methyl-β-naphthyl ether was used giving a temperature of 270° C. After 100 minutes a clear reaction mass of precondensate consisting of low molecular weight polyester was obtained having an average polycondensation degree of 6.

The esterification reaction being finished, i.e. when no longer water was distilled over, the clear reaction melt was transported to a second reaction zone where 0.0042 part of germanium dioxide ($2.10^{-4}$ mole/mole of ethylene terephthalate repeating units in the precondensate that has been formed) and 0.013 parts of triphenyl phosphate ($2.10^{-4}$ mole/mole of ethylene terephthalate repeating units in the precondensate) were added to the reaction melt. The germanium dioxide was added as a 1% by weight solution in ethylene glycol obtained according to the processes described in recited United Kingdom Patent Specification 1,091,234 or 1,185,984. The temperature was raised over 30 minutes to 282° C. and the pressure was reduced to 0.1–0.3 mm. of mercury. After 3 hours of stirring at 282° C. vacuum was released and a polyethylene terephthalate polyester was obtained having an inherent viscosity of 0.65. The polyester was clear, had a standard colour of 1.5 and melted at 267° C. indicating a low diethylene glycol content.

EXAMPLE 2

In a glass polymerisation tube equipped with a stirrer, an inlet for dry nitrogen, and a distillation column, a mixture was introduced of 25.4 parts of the BHET (0.1 mole) prepared as described in the first part of Example 1. Further were introduced 16.6 parts of TA (0.1 mole) and 1.86 parts of EG (0.03 mole).

The reactants were heated and stirred at atmospheric pressure under a continuous stream of dry nitrogen and water was distilled off. As heating medium a vapour bath of methyl-β-naphthyl ether was used giving a temperature of 270° C. After 100 minutes a clear reaction mass of precondensate consisting of low molecular weight polyester was obtained having an average polycondensation degree of 6.

Half the amount of precondensate formed was polycondensed as indicated in Example 1 and yielded a polyester with similar properties.

The other half was transported to a second reaction zone where it was glycolised with 5.27 parts of EG (0.085 mole) by heating the reactants for 30 minutes under a reflux condenser at atmospheric pressure in an atmosphere of nitrogen on a vapour bath of 255° C. The BHET formed could be used again as described in the first reaction step.

EXAMPLE 3

The process of Example 2 was repeated with the difference, however, that the esterification was carried out at 255° C., using a vapour bath of a mixture of 73.5 parts by weight of diphenyl ether and 26.5 parts by weight of diphenyl. Esterification was finished after 120 minutes,

EXAMPLE 4

The first step of Example 2 was repeated using the same amounts of BHET and TA, but using 3.72 parts of EG (0.06 mole). Heating while stirring at atmospheric pressure under a continuous stream of dry nitrogen on a bath of methyl-β-naphthyl ether vapour of 270° C. lasted for 110 minutes when a clear reaction mass consisting of low molecular weight polyester was formed.

Half of the thus prepared precondensate was polycondensed as indicated in Example 1 and a polyester was formed having similar properties.

The remainder of the precondensate was heated with 4.34 parts of EG (0.07 mole) under a reflux condenser at atmospheric pressure in an atmosphere of dry nitrogen, using a vapour bath at 270° C. as described above.

The BHET formed could be used again for the preparation of a precondensate as described above.

EXAMPLE 5

The first step of Example 2 was repeated with the same amounts of BHET and TA, but using 3.72 parts of EG (0.06 mole). Heating while stirring at atmospheric pressure under a continuous stream of dry nitrogen on a bath of dimethyl phthalate of 281° C. lasted for 90 minutes, when a clear reaction mass consisting of low molecular weight polyester was formed.

Half of the thus prepared precondensate was polycondensed as indicated in Example 1 and a polyester was formed having similar properties.

The remainder of the precondensate was heated with 4.34 parts of EG (0.07 mole) under a reflux condenser at atmospheric pressure in an atmosphere of dry nitrogen, using a vapour bath at 281° C. as described above.

The BHET formed could be used again for the preparation of a precondensate as described above.

EXAMPLE 6

The first step of Example 2 was repeated using the same amounts of BHET and TA, but using 5.58 parts of EG (0.09 mole). Heating while stirring at atmospheric pressure under a continuous stream of dry nitrogen on a vapour bath of methyl-β-naphthyl ether at 270° C. lasted for 2 hours when a clear precondensate was formed.

Half of the thus prepared precondensate was polycondensed as indicated in Example 1 to form a polyester of similar properties.

The remainder was treated with 3.4 parts of EG (0.055 mole) under a reflux condenser at atmospheric pressure in an atmosphere of dry nitrogen, using a vapour bath at 270° C. as described. The BHET formed could be used again for the preparation of a precondensate as described above.

EXAMPLE 7

In a glass polymerisation tube equipped with a stirrer, an inlet for nitrogen gas and a distillation column, was introduced a mixture of 25.4 parts of BHET (0.1 mole), 16.6 parts of TA (0.1 mole) and 3.72 parts of EG (0.06 mole). 0.0042 parts of germanium dioxide ($4 \times 10^{-4}$ mole/mole of BHET) were added as a 1% solution in EG.

The reactants were heated for only 1 hour at atmospheric pressure under a continuous stream of dry nitrogen and water was distilled off. As heating medium vapours of methyl-β-naphthyl ether at 270° C. were used. A clear precondensate of low molecular weight polyester was formed. As soon as the esterification reaction was finished, half the amount of precondensate formed above was further polycondensed as described in Example 1, after the addition thereto of 0.0065 parts of triphenyl phosphate at ($2.10^{-4}$ mole/mole of ethylene terephthalate repeating units in the prepolymer).

A polyethylene terephthalate having an inherent viscosity of 0.82 was formed. The polyester had a standard colour of 1 and a melting point of 266° C. indicating a low diethylene glycol content.

The remainder of the precondensate was glycolised in a second reaction zone with EG as indicated in Example 5 to form BHET that could be recycled to the first reaction zone for the manufacture of a new batch of precondensate.

EXAMPLE 8

The process of Example 7 was repeated with the difference, however, that in the first step the esterification of BHET, TA and EG was carried out in the presence as catalyst of 0.00536 parts of sodium trihydrogen germanate ($NaH_3Ge_2O_6$) ($2 \times 10^{-4}$ mole/mole BHET) instead of using germanium dioxide. The esterification reaction lasted 1 hour. No influence was noticed upon the further reactions. The polyester obtained had an inherent viscosity of 0.80. The polyester was clear, had a standard colour of 1, and melted at 265° C.

EXAMPLE 9

The process of Example 7 was repeated with the difference, however, that in the first step the esterification was carried out in the presence of 0.00828 parts of titanyl iodate as catalyst ($2 \times 10^{-4}$ mole/mole BHET) instead of germanium dioxide.

The esterification step lasted 45 minutes. No influence was noticed upon the further reactions. The polyester obtained had an inherent viscosity of 0.85 and a standard colour of 10.

EXAMPLE 10

The process described in Example 7 was repeated with the difference, however, that in the first esterification step 0.0082 parts of manganese(II) acetate.$1.8H_2O$ ($4 \times 10^{-4}$ mole/mole BHET) were used as catalyst.

The esterification lasted 90 minutes. The polyester formed had good properties similar with those of Example 1.

EXAMPLE 11

The process described in Example 7 was repeated with the difference, however, that in the first esterification step 0.0088 parts of zinc acetate·$2H_2O$ ($4 \times 10^{-4}$ mole/mole BHET) were used as catalyst.

The esterification lasted 90 minutes and the polyester formed after polycondensation had similar properties to the polyester of Example 1.

EXAMPLE 12

In a glass polymerisation tube equipped with a stirrer, an inlet tube for dry nitrogen and a distillation column, was introduced a mixture of 25.4 parts of BHET (0.1 mole), 18.2 parts of TA (0.11 mole) and 3.72 parts of EG (0.06 mole). 0.0042 parts of germanium dioxide $4 \times 10^{-4}$ mole/mole BHET) were added as a 1% solution in EG.

The reactants were heated and stirred at atmospheric pressure under a continuous stream of dry nitrogen in a vapour bath of 270° C. Water was distilled off. After 90 minutes the esterification was finished, and 0.0065 parts of triphenyl phosphate ($2 \times 10^{-4}$ mole/mole of ethylene terephthalate repeating units present in the precondensate), were added to half the amount of precondensate, which was further polycondensed as described in Example 1, and yielded a polyester having an inherent viscosity of 0.66, a standard colour of 1.5 and a melting point of 265.5° C. indicating a low diethylene glycol content. The other half of the precondensate was heated in a second reaction step with 4.96 parts of EG (0.08 mole) to BHET as described in Example 4, and this BHET could be recycled to the first reaction zone where it was mixed with the amounts indicated for TA and EG and heated to produce again the precondensate.

EXAMPLE 13

In a four-necked reaction flask equipped with a mechanical stirrer, a thermocouple to determine the internal temperature, a double surface reflux condenser heated at 120° C. to eliminate water and to reflux the EG, and an inlet tube for dry nitrogen were introduced 101.6 parts of BHET (0.4 mole), 66.4 parts of TA (0.4 mole) and 7.44 parts of EG (0.12 mole). 0.0168 parts of germanium dioxide ($4 \times 10^{-4}$ mole/mole of BHET) were added as a 1% solution in EG. The reactants were heated in the flask at atmospheric pressure by means of a silicone bath at 270° C. A continuous stream of dry nitrogen was introduced while water was distilled off. After 75 minutes a clear precondensate mass was obtained.

To half the precondensate mass thus obtained 0.026 parts of triphenyl phosphate ($2 \times 10^{-4}$ mole/mole of ethylene terephthalate repeating units in the precondensate) were added and the mixture further polycondensed as described in Example 1. A polyester with similar properties was obtained.

The other half of the precondensate was glycolised to BHET with 21.08 parts of EG (0.34 mole) by heating the reactants in a second reaction zone under a reflux condenser at atmospheric pressure at 270° C. The BHET could be recycled to the first reaction zone and used again in the preparation of precondensate as described above.

EXAMPLE 14

The process of Example 13 was repeated with the difference, however, that the silicone bath was maintained at a temperature of 300° C. As a result of this higher temperature, after 60 minutes a clear precondensate mass already was obtained.

The reaction was further carried out as described in Example 13.

EXAMPLE 15

In a stainless steel autoclave equipped with a stirrer, a gas inlet, and a rectifying column were placed 20.32 kg. of BHET (80 moles) resulting from a previous transesterification reaction between dimethyl terephthalate and EG as described in the first part of Example 1, 13.28 kg. of TA (80 moles), 3.35 g. of germanium dioxide ($4 \times 10^{-4}$ mole/mole of BHET), and 10.43 g. of triphenyl phosphate ($4 \times 10^{-4}$ mole/mole of BHET). The reactants were heated while stirring for 2 hours up to 250° C. whereafter 2.48 kg. of EG (40 moles) were added in 40 minutes. During the addition the temperature was kept constant at 250–255° C. After 10 further minutes of heating the temperature had risen to 270° C., during which the remaining amount of water was distilled off, in order to finally eliminate the theoretical amount of water.

The esterification reaction was finished, when no water was distilled off anymore.

Half the amount of the thus formed precondensate was polycondensed in the usual way but without a further addition of catalyst, the germanium dioxide of the first reaction step still being present. Polycondensation occurred for 2½ hours at a pressure below 1 mm. of mercury and at a temperature of 285° C. The polyester formed was clear, had a colour number of 1 and an inherent viscosity of 0.69.

The other half of the precondensate was glycolised with 3.72 kg. of EG (60 moles) to BHET. This BHET could be used again together with TA and EG to start a new esterification batch.

The polyesters obtained in accordance with the present invention can be formed by conventional methods of spinning and casting into shaped articles such as films, tapes, fibers, bristles, and the like. These can be used in the preparation of photographic film supports, yarns, woven, and non-woven fabrics, papers, leathers and other structures by methods well known in the art.

We claim:
1. A continuous process for the production of high molecular weight polyesters from terephthalic acid and ethylene glycol, which comprises,
   in a first reaction step
      adding terephthalic acid and ethylene glycol to bis-(2-hydroxyethyl)terephthalate at a ratio of 1.0 to 1.1 mole of terephthalic acid per mole of bis-(2-hydroxyethyl)terephthalate present and 0.3 to 0.9 mole of ethylene glycol per mole of free terephthalic acid that is being added,
      heating the resultant mixture to a temperature between 240 and 310° C. in an inert atmosphere and at atmospheric pressure until a precondensate consisting of low molecular weight esterification product is formed,
   separating said precondensate into a first and second half,
   in a second reaction step
      further polycondensing said first half of said precondensate at a temperature of 260 to 300° C. and at a pressure below 1 mm. of mercury until a high molecular weight linear polyester is obtained,
   in a third reaction step
      reacting the second half of said precondensate at a temperature above 200° C. with ethylene glycol, the amount of ethylene glycol added in this step being such that when taken together with half the amount of ethylene glycol added in the first reaction step, an amount is obtained that is molecularly equivalent to the amount of free terephthalic acid added in the first reaction step, thereby glycolizing the precondensate to bis(2-hydroxyethyl)terephthalate, and
   recycling said bis(2-hydroxyethyl)terephthalate to the first reaction step and continuously repeating said steps.

2. Process according to claim 1, wherein there is used in the first reaction step one mole of terephthalic acid per mole of bis(2-hydroxyethyl)terephthalate.

3. Process according to claim 1, wherein in the first reaction step terephthalic acid and ethylene glycol are added simultaneously to bis(2-hydroxyethyl)terephthalate.

4. Process according to claim 1, wherein in the first reaction step terephthalic acid is added to bis(2-hydroxyethyl)terephthalate and this mixture is heated to a temperature above 240° C. and only then ethylene glycol is added.

5. Process according to claim 1, wherein the precondensate formed in the first reaction step has an average polycondensation degree comprised between 4 and 8.

6. Process according to claim 1, wherein the reaction of bis(2-hydroxyethyl)terephthalate, terephthalic acid, and ethylene glycol in the first reaction step is carried out in the presence as catalyst of a compound taken from the group consisting of germanium dioxide, sodium trihydrogen germanate, titanyl iodate, manganese(II) phenyl acetate, manganese(II) acetate, and zinc acetate.

7. Process according to claim 1, wherein triphenyl phosphate is added as stabilizer in the second reaction step.

8. Process according to claim 1, wherein in the third reaction step half the amount of precondensate is heated to a temperature above 200° C. with 0.55 to 0.85 mole of ethylene glycol per mole of free terephthalic acid added in the first reaction step.

References Cited

UNITED STATES PATENTS

| | | | |
|---|---|---|---|
| 3,497,473 | 2/1970 | Kemkes | 260—75 |
| 3,506,622 | 4/1970 | Higgins | 260—75 |
| 3,639,448 | 2/1972 | Matsuzawa et al. | 260—75 |
| 3,644,483 | 2/1972 | Griehl et al. | 260—75 |

FOREIGN PATENTS 23,564  10/1964  Japan.

MELVIN GOLDSTEIN, Primary Examiner